Sargent & Ely.
Cotton Gin.
Nº 89,891.          Patented May 11, 1869.
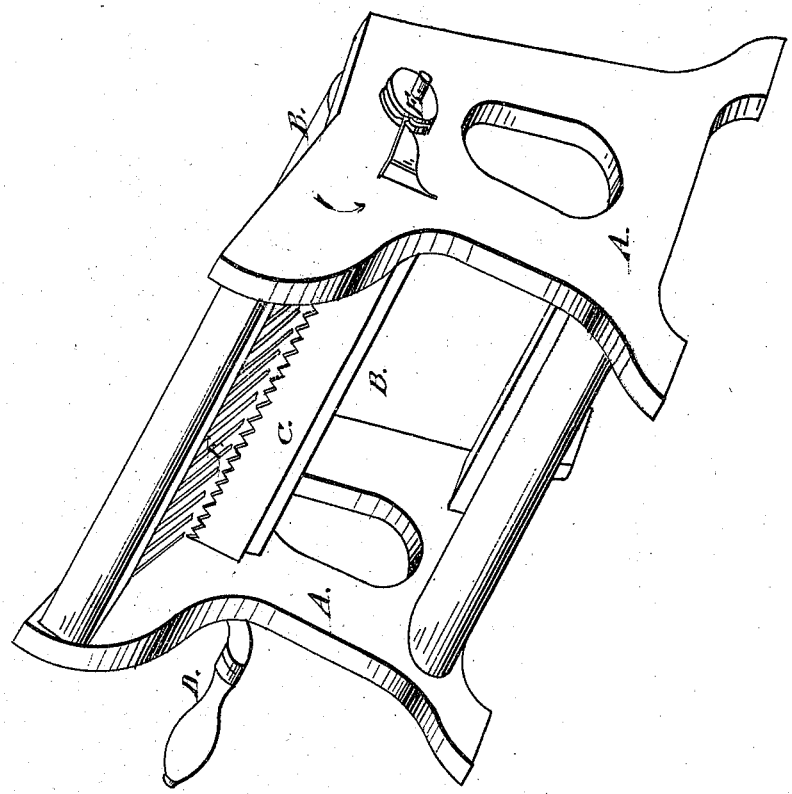

CHARLES G. SARGENT, OF WESTFORD, AND ALFRED B. ELY, OF NEWTON, MASSACHUSETTS.

Letters Patent No. 89,891, dated May 11, 1869.

IMPROVEMENT IN COTTON-GINS.

The Schedule referred to in these Letters Patent and making part of the same.

Be it known that we, CHARLES G. SARGENT, of Westford, and ALFRED B. ELY, of Newton, in the State of Massachusetts, have made certain Improvements in Cotton-Gins, of which the following, with the drawing, is a description.

A patent has been heretofore granted to A. B. ELY, for "an elastic roll, in combination with flat plates, whether one or more, and whether with plain or serrated edges, when arranged and operating substantially as described."

Our improvement consists in using a reciprocating flat plate, with serrated edges, in combination with an elastic or partially-elastic roll.

A represents the frame.

B, the roll, having an elastic or semi-elastic surface.

C, the flat plate, with serrated edge, reciprocating in close proximity to the surface of the roll.

D is the crank, for revolving the roll.

E is a grooved cam-pulley, at the other end of the axis of the roll, into the groove of which projects a point from the plate, by means of which the plate is reciprocated.

F are grate-bars.

Any further description is needless to those acquainted with cotton-gins.

The cotton and seeds being fed up to the roll, the fibre is drawn off by the action of the roll, while the seeds are knocked off against the edge of the plate. This edge being serrated, and reciprocating, assists in the manipulatory process.

The serrated, or corrugated edge of the plate is placed so that the fibre is brought down, in the direction of the arrow, toward and under the plate, from the edge downward, while the seeds, &c., are retarded and knocked off by and against the edge; and this arrangement, combination, and mode of operation is, we believe, new, by means of the reciprocation of the plate-edge toward the coming fibre, which is fed in upon the top of the roll and grates.

What we claim, is—

An elastic or partially elastic-surfaced roll, in combination with a reciprocating guard-plate, having a serrated, or corrugated edge, arranged and operating substantially as described.

In testimony whereof, we have hereunto subscribed our names.

CHAS. G. SARGENT.
A. B. ELY.

Witnesses:
W. M. PARKER,
F. K. GOULD.